US006252170B1

(12) United States Patent
Korinek

(10) Patent No.: US 6,252,170 B1
(45) Date of Patent: Jun. 26, 2001

(54) TWIST-ON WIRE CONNECTOR WITH TORQUE LIMITING MECHANISM

(75) Inventor: Chris W. Korinek, Cedarburg, WI (US)

(73) Assignee: GB Electric Incorporated, Milwaukee, WI (US)

( * ) Notice: Subject to any disclaimer, the term of this patent is extended or adjusted under 35 U.S.C. 154(b) by 843 days.

(21) Appl. No.: 08/542,231

(22) Filed: Oct. 12, 1995

(51) Int. Cl.[7] .................... H02G 15/08
(52) U.S. Cl. .................... 174/87
(58) Field of Search .................... 174/87, 84 S; 29/758; D13/150; 81/431

(56) References Cited

U.S. PATENT DOCUMENTS

| | | | |
|---|---|---|---|
| D. 315,139 | 3/1991 | Blaha | D13/150 |
| D. 315,143 | 3/1991 | Blaha | D13/150 |
| 4,288,657 | 9/1981 | Swanson | 174/87 |
| 4,691,079 | 9/1987 | Blaha | 174/87 |
| 4,883,921 | 11/1989 | Legerius et al. | 174/87 |
| 5,132,494 * | 7/1992 | Burton et al. | 174/87 |
| 5,148,727 * | 9/1992 | Williamson | 81/121.1 |

* cited by examiner

*Primary Examiner*—Dean A. Reichard
(74) *Attorney, Agent, or Firm*—Quarles & Brady LLP; George E. Haas

(57) ABSTRACT

Ends of several electrical wires are joined by a connector to a predefined torque level. The connector includes a hollow body having an open end, a smaller closed end and an outer surface extending between the two ends. The outer surface has a portion with an equilateral polygonal cross-section for engagement by a tool to effect rotation of the body. The portion of the body is specifically designed with elements, such as the corners of the polygon, which become rounded when the tool applies torque that exceeds the predefined torque level. Such deformation of the body thereby prevents excessive torque from damaging the electrical wires. Another portion of the body is provided to enable another tool to engage the connector for removal from the wires.

19 Claims, 3 Drawing Sheets

TWIST-ON WIRE CONNECTOR WITH TORQUE LIMITING MECHANISM

BACKGROUND OF THE INVENTION

The present invention relates to electrical wire connectors; and more particularly, to twist-on type connectors such as those having a tapered coil of electrically conductive material within an insulating shell.

The ends of two or more wires for an electrical circuit are often connected together using a twist-on type wire connector. These connectors are available in a variety of sizes and shapes and commonly have a conical shaped body of insulating material, such as plastic, with an opening at the larger end. The opening communicates with a similarly tapered aperture which may have helical threads cut therein. The fastening operation is performed by inserting the stripped ends of two or more wires into the open end and rotating the connector so that the threads screw onto and twist the wires to form an electrical coupling. In an improvement of the basic connector a tapered coiled metal spring is inserted into the aperture of the insulating shell. The spring engages the bare wires and aids in providing a conductive path therebetween.

Twist-on type wire connectors frequently are used by electricians to connect two or more wires in a junction box within a building. Electricians typically twist the connectors on by hand, although hand tools such as a hexagonal socket wrench or nut driver sometimes are used. These connectors also are employed to make similar electrical couplings in a variety of electrical appliances. For example, connections between the wires of a ballast in a fluorescent lighting fixture and wires for the lamp sockets are made in this manner. In a factory, the wire connectors often are applied using an electrically or pneumatically powered nut driver, because of the high volume assembly at a fixed location. These power tools had a socket specifically designed to engage the body of the connector.

One of the difficulties is that the tool can easily apply an excessive amount of torque to the connector that is significantly greater than the predefined level established by the Underwriters Laboratory for making an optimum electrical connection. Although previous wire connectors of this type were designed to be as strong as possible the excessive torque often caused the connector to fracture in an uncontrolled, random manner. If such cracks went undetected, a short circuit could occur at the connection. In other cases the excessive torque fractured the producing either an open circuit or a high resistance path which over heated.

One solution to this problem was to use a torque limiting device between the driving element of the tool and the socket. However, torque limiting devices add additional expense to the tool, and require adjustment to the optimum level for each specific wiring application.

SUMMARY OF THE INVENTION

A general object of the present invention is to provide a twist-on wire connector which is adapted for use with a manual or power driven fastening tool.

Another object of the present invention is to provide such a wire connector which self-limits the amount of torque that the tool may apply to the connector during the fastening operation.

DETAILED DESCRIPTION OF THE INVENTION

Figure 4:
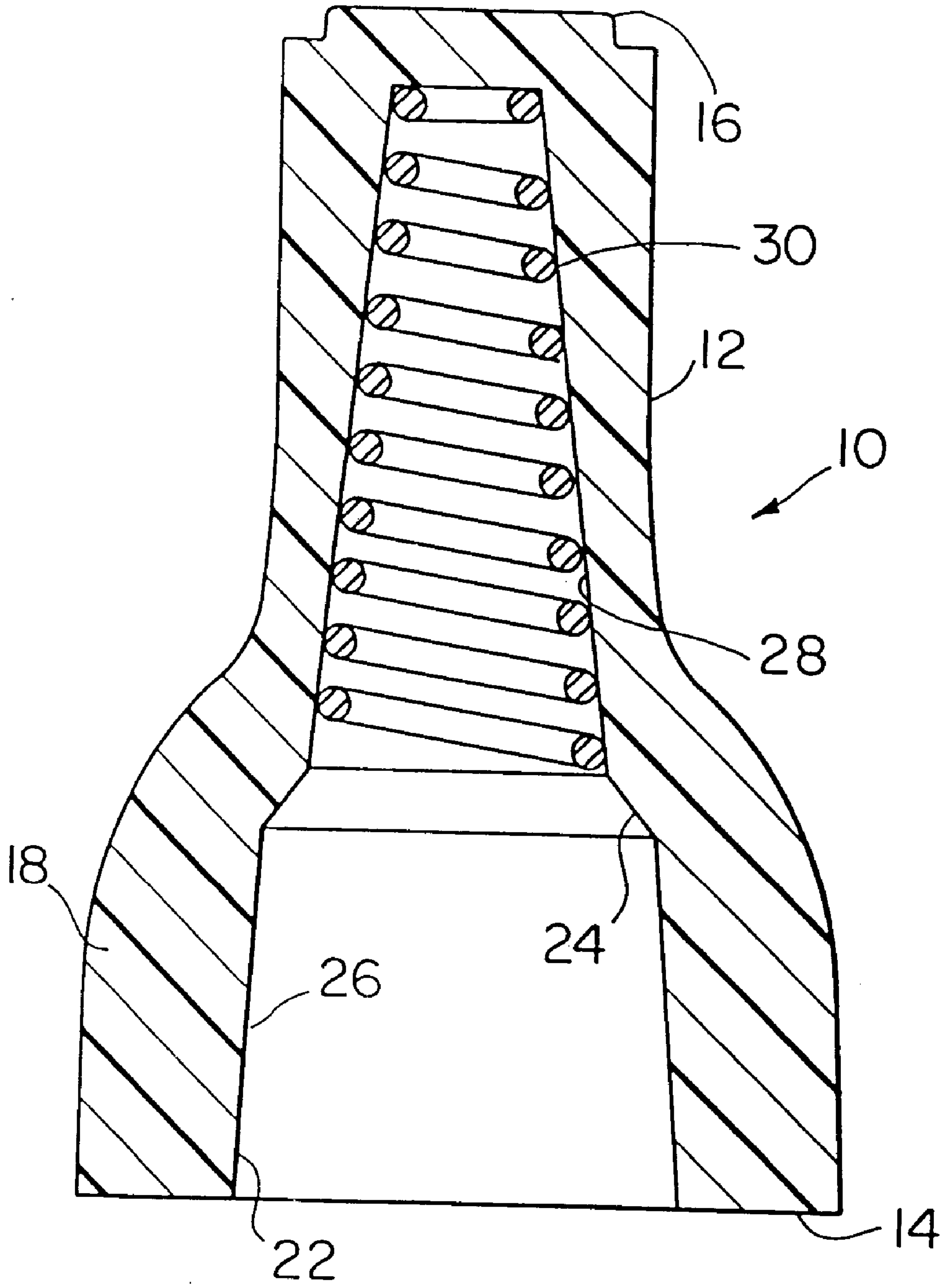
FIG. 4 is a longitudinal cross-sectional view through the wire connector.

Referring to FIGS. 1–5, a twist-on wire connector 10 is formed of a hollow body 12 having a general shape of a truncated cone. The body 12 preferably is formed of molded plastic and has an open end 14 which tapers to a smaller diameter closed end 16. The open end 14 of the wire connector has a circular aperture 22 extending axially into the body 12 terminating a short distance from the closed end 16. As shown in FIG. 4, the aperture 22 tapers in a narrowing manner reaching a shoulder 24 approximately one-third the depth of the aperture. The shoulder 24 defines an outer portion 26 of the aperture 22 and a smaller cross-section inner portion 28. A tapered coil spring 30 made of electrically conductive metal is wedged into the smaller diameter portion.

Figure 2:
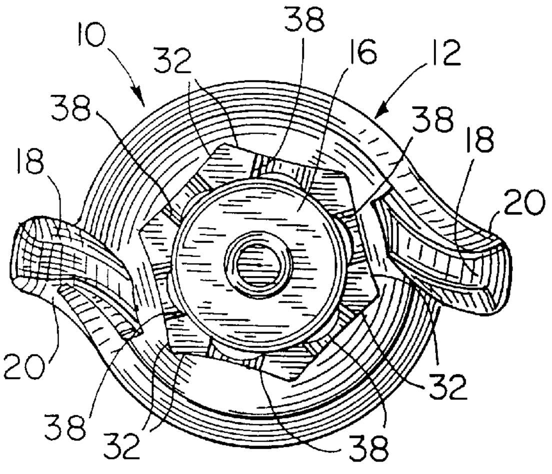
FIG. 2 is a plane view of the top of the wire connector.
Figure 3:
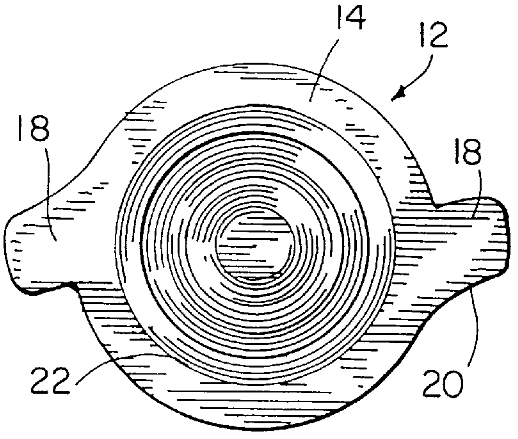
FIG. 3 is a plane view of the wire connector bottom.

The wire connector 10 also includes a pair of wings 18 which extend radially from the body adjacent open end 14. The radially inner portion of the wings 18 provide exterior longitudinal reinforcement thereby preventing collapsing of the body 12. With particular reference to FIG. 2, the wire connector 10 is fastened onto wires by turning it in the clockwise direction in the orientation illustrated. The first longitudinal surface 20 of each wing 18 that is encountered going clockwise around the perimeter of the body has a curvature which flows tangentially from the outer radius of the body surface to an outer edge of the wing. This curvature conforms to the contour of a user's providing a comfortable fit when the connector is turned onto a pair of wires, as will be described. This curved surface of each wing 18 has grooves which also help the fingers grip the wire connector.

Figure 1:
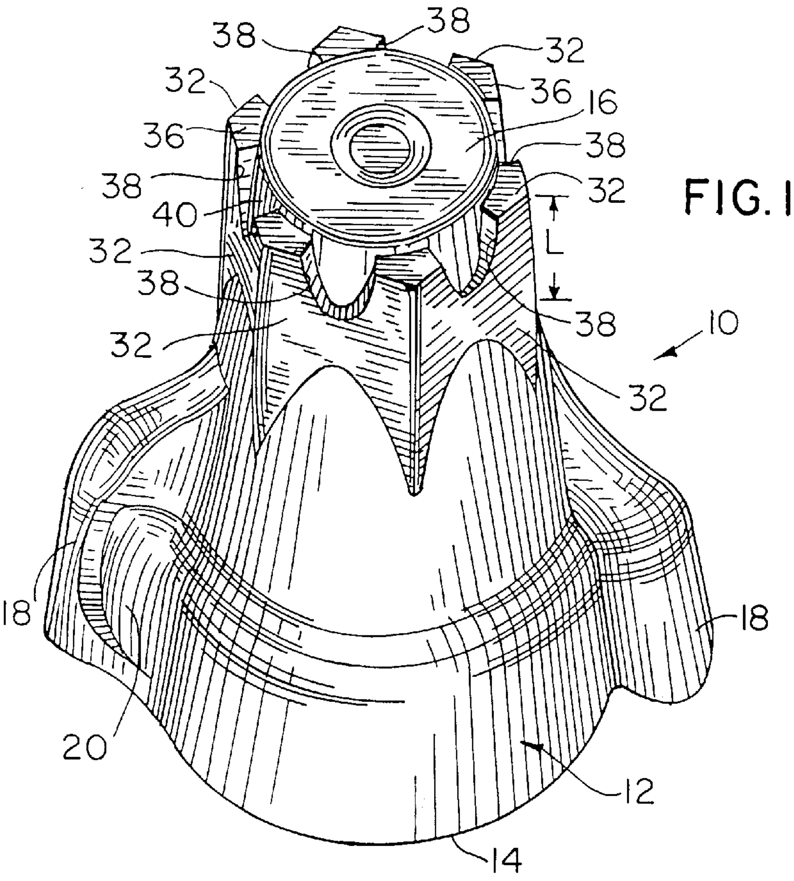
FIG. 1 is a an isometric view of a twist-on wire connector according to the present invention.

With particular reference to FIGS. 1 and 2, as the outer curved surface of the body 12 tapers from the open end 14 to the closed end 12, a transition occurs to six flat surfaces 32. These flat surfaces define a portion of the body which has an equilateral hexagonal cross-section which conforms to the dimensions of a conventional socket for driving a hexagonal nut. Although the exemplary wire connector 10 has a hexagonal portion various numbers of flat surfaces may be provide to form a body portion with different polygonal cross-sections for tool engagement. The flat surfaces 32 tapers slightly inward going toward the closed end 16 thus forming a truncated six sided pyramidal shape. This slight tapering of the hexagonal flat surfaces 32 not only aids in insertion and removal of the connector from a driver socket, but also serves as part of a torque limiting mechanism, as will be described. Each flat surface 32 terminates at an edge 36 near the closed end 16 and a conical tip extends from the edges 36 to the closed end.

A separate semi-oval shaped notch 38 extends into each flat surface 32 from edge 36 and has a side wall extending between the flat surface 32 and the surface 40 of the conical portion of the body adjacent the closed end 16. The notches 38 reduce the thickness of the body wall and provide dimensional stability to the closed end of the body. If the notches were not present, sink-hole depressions could form in the surfaces 32 while molding the plastic body. Such uncontrolled distortions of the body could preclude proper engagement of the tool used to fasten the connector 10. The notches 38 also enable the wire connector body 12 to be molded more rapidly as the cooling time required for the plastic is reduced.

The present wire connector 10 is particularly suited for manufacturing operations that involve repetitive electrical connections of the same number and sizes wires. For example, the connector may be employed in fabricating fluorescent light assemblies and specifically designed for coupling a pair of 16 gauge wires. Because the nature of the electrical connection to be made is well-defined and does not vary in high volume manufacturing operations, the torque level to which the twist-on connector is to be fastened for a good connection can be determined. In the United States, Underwriters Laboratory has specified a set of optimum torque levels for attaching different numbers and sizes of electrical wires. As a result, the wire connector 10 can be specifically designed to yield when that optimum torque is reached thereby preventing excessive torque from being applied by a power tool used in particular fastening operation.

In use, the stripped ends of two or more wires are inserted into the opening 22 at the open end 14 of the connector 10. The closed end 16 of the connector then is placed into a hexagonal socket attached to an electrically or pneumatically powered driver or even a manual driver. Because the six flat surfaces 32 taper toward the closed end thereby forming a truncated six-sided pyramidal structure, the connector 10 fits into the socket to a predetermined depth L at which point the six surfaces 32 engage the opening of the socket and prevent further insertion of the connector. Thus the angle of the surface taper defines the degree of contact of the pyramidal portion of the connector body with the socket of the power tool.

The power tool then is activated to apply a clockwise rotational torque to connector 10 in the orientation of the device shown in FIG. 2. This rotation causes the threaded interior of the aperture 22 to engage the stripped ends of the wires and twists the wires together within the connector.

As previously noted, the electrical or pneumatically powered tool can apply an excessive amount of torque to the connector and break the connector or the wires being fastened. To prevent the excessive amount of torque, the corners of the hexagon formed by the abutment of adjacent flat surfaces 32 are designed to become rounded when the desired optimum torque level has been applied by the tool to the connector. Several design factors determine the torque level at which the rounding occurs and include the depth L to which the connector is inserted into the socket, the radius of each corner of the pyramidal portion, and the distance across the pyramidal portion (e.g. the distance between opposite faces of the hexagon in FIG. 2).

Once the corners become rounded, the socket merely turns on the wire connector 10 and torque is not transferred there between. Thus, the tool can only fasten the wire connector to the desired torque limit. The yielding of the corner elements on the connector body 12 not only prevents excessive amount of torque from being applied, but also ensures that the optimum torque level is applied as the corner elements do not yield until that level has been reached.

Should it become necessary to remove the wire connector 10 from the wires, the user can grab the connector body 12 by placing fingers against the two wings 20 and applying torque to the connector while holding the wires to unscrew the connector. Alternatively, a power driven tool with a slightly larger socket than the socket employed to attach the wires can be used to effect removal of the connector In this case, the larger hexagonal socket will extend over the closed end 16 of the connector body 12 past the depth L at which the corners were rounded and engage the pyramidal portion farther down the body 12 where the corners have not been rounded. As another alternative, a special socket may be used which has semi-oval tabs that fit tightly within the notches 38 to apply torque to the notch side walls.

Figure 5:
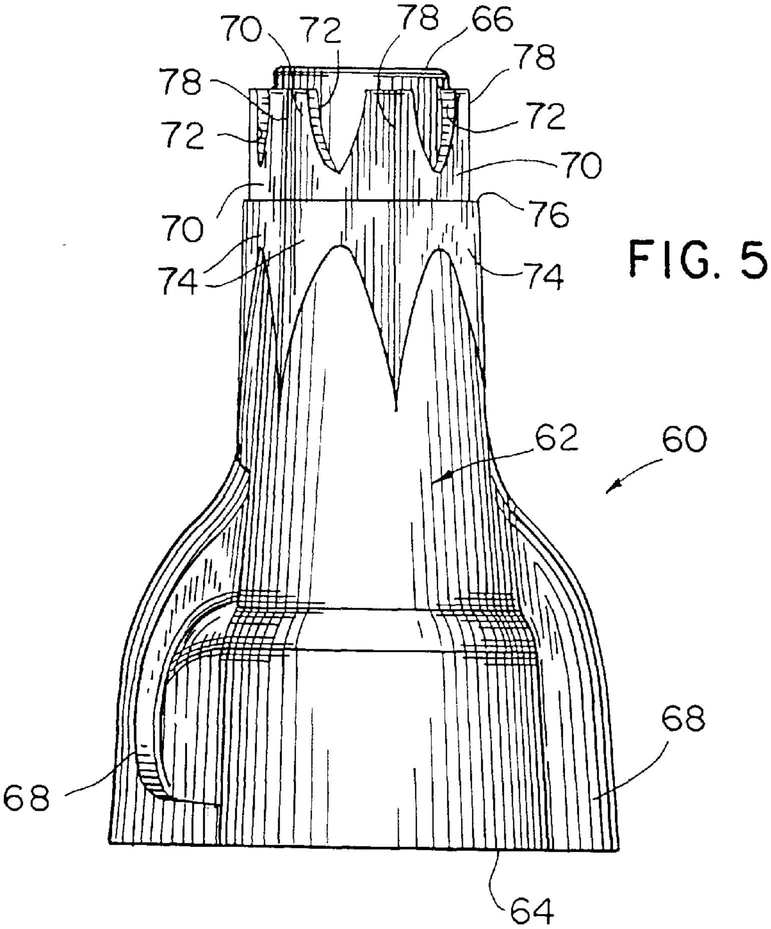
FIG. 5 is a side elevational view of another embodiment of a wire connector according to the present invention.
Figure 6:
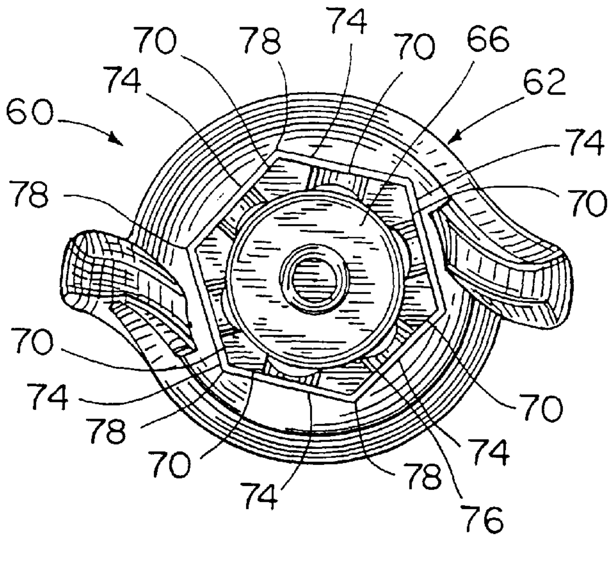
FIG. 6 is a plane view of the top of the wire connector in FIG. 5.

With reference to FIG. 5 a second embodiment of a wire connector according to the present invention is designated as 60. This second twist-on wire connector 60 is similar to connector 10 previously described in that it has a generally conical shaped insulating body 62 with an open end 64, a closed end 66 and a pair of wings 68 that extend radially adjacent the open end 64.

The second wire connector 60 also has a first set of six flat surfaces 70 arranged to form a hexagonal cross-sectional region of the body 62, although other polygonal shapes can be used. The first set of flat surfaces 70 are arranged preferably in a tapering manner to form a truncated section of a pyramid. Each flat surface 70 has a semi-oval shaped notch 72 extending inward from a surface edge that is adjacent to the closed end 66. As with the previous embodiment the semi-oval shaped notches 72 reduce the amount of plastic material in body 62 facilitating the molding operation and providing a more uniform flat surfaces to the first set of surfaces 70.

The second twist-on electrical connector 60 also has a second set of six flat surfaces 74 located inwardly of the first set from the closed end 66. The second set of flat surfaces 74 also are arranged to form another hexagonal cross-sectional region which is coaxial with, but slightly larger than the hexagonal cross-sectional region formed by the first set of flat surfaces 70. This size difference in the two exagonal regions form a shoulder 76 on the outer surface of body 62 where the two regions adjoin.

When using the second wire connector 60, stripped ends of two or more electrical wires are inserted into the open end 64. A tool having a hexagonal socket, for example, is placed over the closed end 66. The socket is sized to tightly fit over the first set of flat surfaces 70 so that torque can be transferred from the socket to those surfaces of the wire connector 60. The shoulder 76 acts as a stop restricting the depth to which the wire connector 60 can be inserted into the socket and thus the degree to which the flat surfaces 70 engage the socket. The shoulder 76 more positively restricts the depth to which the connector can be inserted into the socket than simply the tapering nature of the flat walls 32 in the embodiment of FIG. 1. This insertion depth defined by the shoulder 76 determines a torque level at which the socket will round the corners 78 of the polygon formed by the first set of flat surfaces 70. The radial distance from the longitudinal axis of the connector to each corner 78 and the radius of each corner also define the torque level at which the corners become rounded.

To remove a second twist-on wire connector 60, a larger hexagonal socket is applied over the second set of flat surfaces 74 to unscrew the second connector from the wires.

Alternatively, the corners of the polygonal cross-section region formed by the second set of flat surfaces 74 can be designed to yield when an excessive amount of torque is applied and thus the larger sized socket is used to attach the second connector 60 to the wires. In this instance a smaller hexagonal socket, which engages the first set of flat surfaces 70, can be employed to remove the second connector 60.

I claim:

1. A twist-on connector for joining ends of electrical wires to a predefined torque level, wherein the connector comprises a hollow body having an open end, a closed end, and an outer surface extending between the open end and the closed end, the outer surface having elements which form an external polygonal shape for engagement by a tool to effect rotation of the hollow body, wherein the elements deform upon application of greater than the predefined torque level in order to prevent excessive torque from damaging either or both of the electrical wires and the connector.

2. The connector as recited in claim 1 wherein the elements form an external equilateral polygonal shape.

3. The connector as recited in claim 1 wherein the elements are a plurality of surfaces with each one abutting two adjacent ones of the plurality of surfaces thereby forming corners of the external polygonal shape, wherein the corners become rounded upon the tool applying torque which exceeds the predefined torque level.

4. The connector as recited in claim 3 wherein the corners form an equilateral polygonal shape.

5. The connector as recited in claim 3 wherein each of the plurality of surfaces is substantially flat.

6. The connector as recited in claim 3 further comprising a stop formed on the outer surface to restrict positioning of the tool onto the hollow body and thereby establish a torque level at which deformation of the corners occurs.

7. The connector as recited in claim 3 wherein at least one of the plurality of surfaces has a notch, in an edge adjacent to the closed end, for receiving another tool in the notch to effect rotation of the hollow body.

8. The connector as recited in claim 1 wherein the elements are a plurality of surfaces forming a truncated pyramidal section of the outer surface and defining corners where adjacent ones of the plurality of surfaces abut, wherein the corners become rounded by the tool applying torque which exceeds the predefined torque level.

9. The connector as recited in claim 1:

wherein the elements are a first plurality of surfaces with each one abutting two adjacent other ones of the first plurality of surfaces thereby forming corners of the external equilateral polygonal shape, in which the corners become rounded upon the tool applying torque which exceeds the predefined torque level; and further comprising a second plurality of surfaces with each one abutting two adjacent other ones of the second plurality of surfaces thereby forming corners of another external equilateral polygonal shape for engagement by a tool to effect rotation of the hollow body.

10. The connector as recited in claim 1 further comprising a pair of wings extending radially from opposite sides of the hollow body.

11. A twist-on connector for joining ends of electrical wires to a predefined torque level, wherein the connector comprises a hollow body with an open end, a closed end which is smaller in cross-section than the open end, and an outer surface extending between the open and closed ends, the outer surface having a portion with an equilateral polygonal cross-section for engagement by a tool to effect rotation of the hollow body, wherein the portion has corners which deform upon the tool applying torque that is greater than the predefined torque level and thereby prevent excessive torque from being applied to the hollow body.

12. The connector as recited in claim 11 further comprising a stop on the outer surface to restrict positioning of the tool onto the hollow body and thereby establish a torque level at which deformation occurs.

13. The connector as recited in claim 11 wherein the elements are a first plurality of surfaces which abut one another thereby forming corners of the portion with an equilateral polygonal cross-section, wherein the corners become rounded by the tool applying torque which exceeds the predefined torque level; and further comprising a second plurality of surfaces which abut one another thereby forming another portion with an equilateral polygonal cross-section.

14. The connector as recited in claim 11 wherein the portion of the hollow body is formed by a plurality of surfaces arranged to form the equilateral polygonal cross-section; and wherein at least one of the plurality of surfaces has a notch in an edge adjacent to the closed end, for receiving another tool in the notch to effect rotation of the hollow body.

15. The connector as recited in claim 11 wherein the portion of the hollow body is formed by a plurality of surfaces arranged to form the portion with an equilateral polygonal cross-section.

16. The connector as recited in claim 11 further comprising a pair of wings extending radially from opposite sides of the hollow body.

17. A twist-on connector for joining ends of electrical wires to a predefined torque level, wherein the connector comprises a hollow body with an open end, a closed end which is smaller in cross-section than the open end, and an outer surface extending between the open and closed ends, the outer surface having a portion with a plurality of surfaces arranged to form an equilateral polygonal cross-section for engagement by a tool to effect rotation of the hollow body, each one of the plurality of surfaces having an edge adjacent to the closed end which edge has a notch therein to reduce the thickness of the body.

18. The connector as recited in claim 17 further comprising a pair of wings extending radially from opposite sides of the hollow body.

19. The connector as recited in claim 17 wherein the elements are a first plurality of surfaces which abut one another thereby forming corners of the portion with an equilateral polygonal cross-section, wherein the corners become rounded by the tool applying torque which exceeds the predefined torque level; and further comprising a second plurality of surfaces which abut one another thereby forming another portion with an equilateral polygonal cross-section.

* * * * *